United States Patent
Palmer et al.

(10) Patent No.: US 6,556,553 B1
(45) Date of Patent: Apr. 29, 2003

(54) METHOD FOR DETERMINING WHEN A COMMUNICATION DEVICE SHOULD RATE SHIFT OR ROAM IN A WIRELESS ENVIRONMENT

(75) Inventors: Brian G. Palmer, Redmond, WA (US); Alan F. Jovanovich, Des Moines, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/291,581

(22) Filed: Apr. 12, 1999

(51) Int. Cl.$^7$ ................................................. H04Q 7/20
(52) U.S. Cl. .................... 370/333; 370/331; 455/440; 455/436
(58) Field of Search ................................ 370/333, 332, 370/331, 334; 455/436–442, 456, 457, 432, 522, 67.1, 67.6; 375/132

(56) References Cited

U.S. PATENT DOCUMENTS

| | | | |
|---|---|---|---|
| 5,327,576 A | * 7/1994 | Uddenfeldt et al. | 370/333 |
| 5,371,738 A | 12/1994 | Moelard et al. | 370/331 |
| 5,425,051 A | 6/1995 | Mahany | 375/132 |
| 5,448,569 A | 9/1995 | Huang et al. | 370/332 |
| 5,633,888 A | 5/1997 | Stewart | 375/132 |
| 5,862,171 A | 1/1999 | Mahany | 375/132 |
| 6,253,082 B1 | * 6/2001 | Hengeveld | 455/436 |
| 6,330,447 B1 | * 12/2001 | Hengeveld | 455/436 |

FOREIGN PATENT DOCUMENTS

EP          0 818 938          1/1998

* cited by examiner

*Primary Examiner*—Tracy Legree
(74) *Attorney, Agent, or Firm*—O'Melveny & Myers LLP

(57) ABSTRACT

Methods for improving communication performance in a wireless communication system where the wireless communication system has at least one mobile wireless communication device and a plurality of transmitter/receiver sites. The transmitter/receiver sites have a geographic area, defined as a cell, within which the mobile wireless communication devices can communicate with at least one of the transmitter/receiver sites. The methods determine when the mobile wireless communication device should rate shift or roam based on connection quality measurement data. In one method, the measurement data is subjected to configurable parameters to create a functional relationship value that is recorded. The recorded functional relationship values are trended and extrapolated to determine whether a rate shift or roam should be performed. In a second method, the measurement data taken prior to a communication connection failure is stored in at least one data vector with there being at least one data vector for each rate shift and one for roam. A functional relationship utilizing current measurements, last data rate, and the respective data vectors determines whether a rate shift or roam should be performed.

40 Claims, 4 Drawing Sheets

METHOD FOR DETERMINING WHEN A COMMUNICATION DEVICE SHOULD RATE SHIFT OR ROAM IN A WIRELESS ENVIRONMENT

BACKGROUND OF THE INVENTION

1. Field of the Invention

The present invention relates to wireless communication systems, and more particularly, to a method for determining when a wireless communication device should rate shift or roam in order to improve communication performance.

2. Description of Related Art

The ability to communicate with people on the move has evolved considerably since Guglielmo Marconi in 1897 first demonstrated radio's ability to provide continuous contact with ships sailing the English Channel. Since then new wireless communications methods, including mobile radio communications, have grown by orders of magnitude, fueled by electronic miniaturization technologies and the large-scale deployment of affordable, easy-to-use, radio communication networks.

One example of a radio communication network is a wireless local area network (WLAN). A WLAN comprises a plurality of wireless communication devices that communicate using radio frequency (RF) signals. As in a wired local area network (LAN), the WLAN allows users to seamlessly access disk drives, printers, and additional computer resources and systems connected to the WLAN. The wireless communication devices include a radio receiver/transmitter adapted for RF communication with the other elements of the WLAN. The WLAN may also include a central host processing unit that sends information to and receives information from any one of the plurality of remotely disposed communication devices.

The central host processor may also form part of a separate wired LAN to provide a bridge with the WLAN. In such a WLAN, the wireless communication devices may comprise portable units that operate within a defined environment to report information back to the central host processing unit. In general, the defined wireless environment may be further divided into basic service areas or cells that are supported by transmitter/receivers of the WLAN for providing segmented but complete wireless coverage for the wireless communication devices over the defined area. Thus, WLAN systems offer increased flexibility over wired LAN systems by enabling operators of the wireless communication devices substantial freedom of movement through the environment, and are particularly useful for remote data collection applications such as inventory control, manufacturing and production flow management, and asset tracking.

For example, in a WLAN, a mobile worker may move throughout the work area carrying a wireless communication device such as a portable terminal or computer. The work area may be within a building or from one building to another and the mobile worker may move from one cell to another. The wireless device must maintain a wireless connection that is transparently maintained so that the central host processing unit and the mobile worker can perform their assigned tasks. As the worker travels within a cell or from one cell to another, it may become necessary for the wireless communication device to lower the transmission rate in order to maintain the connection to the transmitter/receiver of the current cell. Alternatively, the wireless communication device may switch (also known as roam) from the current cell to another cell that may offer better connection quality to the WLAN. In either case, the wireless communication device must make this transition without a loss of connection or service degradation being noticed by the mobile worker or the central host processing unit. The transition should be seamless and appear and operate as a wired connection.

A typical WLAN determines whether to rate shift or roam based on (1) the failure to successfully transmit and/or (2) comparison of the connection quality between one or more cells with respect to (i) an acceptable predefined threshold or (ii) connection quality. These methods for rate shifting or roaming are relatively inflexible. For example, they cannot be easily modified through configuration parameters or dynamically based on the wireless environment. Furthermore, these methods also react to the state of the wireless connection rather than anticipate the state. By reacting to the state of a connection, the decision to rate shift or roam occurs at the moment when the wireless communication device is ready to transmit. This results in slower response times as conditions change. The wireless network performance suffers and utilization difficulties arise such as delays in transmission or necessary retransmissions. Finally, there may be a complete connection loss between the wireless communication device and the central host processing unit.

Under some current implementations, delays in rate shifting and/or roaming within a cell or to a new cell may result in the loss of a network connection, such as a TCP/IP network connection, between the wireless communication device and the central host processing unit. When this occurs, the worker must reinitiate a logon sequence to the host, then to the required application, and finally repeat the work that was lost due to the TCP/IP connection loss. If the mobile worker is in a location situated at a cell boundary or at the boundary of several cells, the wireless communication device may be unable to effectively maintain a connection due to interference or marginal signal quality. The worker then would be unable to perform the assigned tasks because of the communication connection failure.

This situation can be further aggravated by changing conditions within a cell or among cells of the wireless environment. For example, inventory moved around within a warehouse or workspaces that are reconfigured can affect communication performance, including cell coverage, and place increased demands upon the rate shift and roam functions.

Accordingly, it would be desirable to provide a method for determining when a communication device should rate shift or roam in a wireless environment. The method would improve communication connections and performance by reducing the number of required retransmissions, offer an optimum bandwidth, and faster response time. The method would further reduce network connection losses due to the use of industry standard network protocols by the wireless media. Furthermore, the method would be flexible and anticipate the rate shift and roam requirements, even as the communication environment evolves.

SUMMARY OF THE INVENTION

In accordance with the teachings of the present invention, a method is provided for determining when a communication device should rate shift or roam in a wireless environment. The method improves communication by dynamically and flexibly anticipating when a rate shift or roam should occur.

In an embodiment of the present invention, a method is provided for improving communication performance in a wireless communication system where the wireless communication system has at least one mobile wireless communication device and a plurality of transmitter/receiver sites. The transmitter/receiver sites have a geographic area, defined as a cell, within which at least one mobile wireless communication device can communicate with at least one of the transmitter/receiver sites.

According to a first embodiment of the present invention, the method comprises obtaining at least one measurement related to connection quality at discrete intervals and subjecting the measurement(s) to at least one configurable parameter to create a functional relationship value that is recorded. The recorded functional relationship values are then trended and extrapolated to obtain an extrapolated functional relationship value that is used to determine whether to rate shift or roam. The configurable parameter(s) may comprise measurement utilization criteria such as a use/don't use decision, measurement application criteria such as a weighting factor, or measurement decision criteria such as a threshold.

According to a second embodiment of the present invention, the method comprises obtaining at least one measurement related to connection quality at discrete intervals and storing the measurement(s) taken prior to a communication connection failure in at least one data vector. Whether to rate shift or roam is determined based on a functional relationship utilizing current measurements, last data rate, and the respective data vector(s). There will be at least one data vector for each rate shift and one for roam. The functional relationship may comprise a comparison between the current measurements and the last data rate with either the respective data vector(s) or the median, highest, or lowest value of the respective data vector(s).

The measurements, in accordance with the embodiments, may comprise at least one of signal-to-noise ratio, bit error rate, number of transmission retries, received signal strength indicator, bit energy-to-noise density, global position information, or cell congestion information.

According to a third embodiment of the present invention, a storage medium contains program instructions executable by a processor for improving communication performance in a wireless communication system. The program comprises the steps for a method in accordance with the first or second embodiments described above.

According to a fourth embodiment of the present invention, the mobile wireless communication device, for the wireless communication system described above, has a memory and a processor that runs a program stored in the memory. The program comprises the steps for a method in accordance with the first or second embodiments described above.

A more complete understanding of the method for determining when a communication device should rate shift or roam in a wireless environment will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

Figure 1:
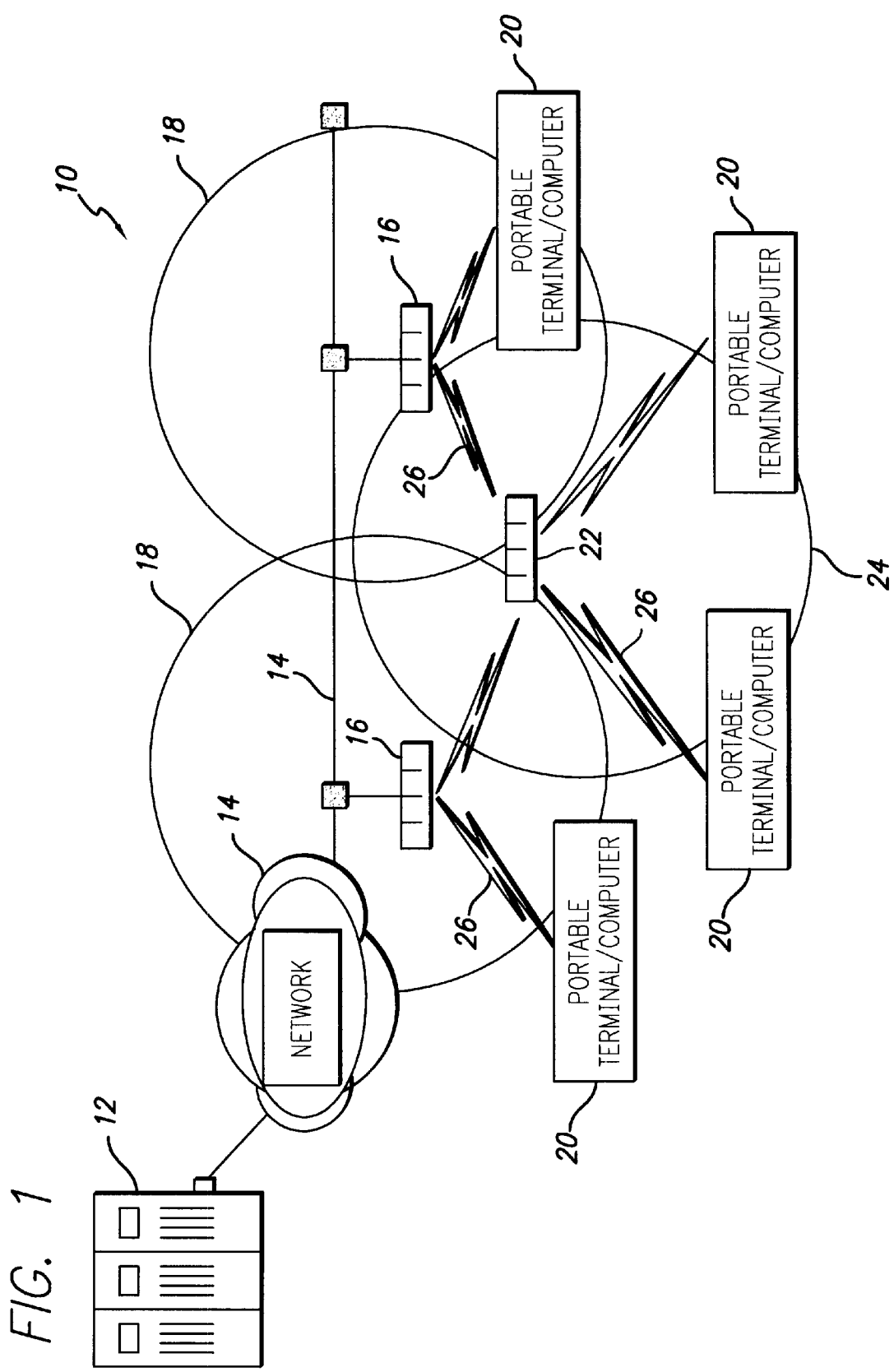
FIG. 1 is a system diagram illustrating a communication system within a facility.

The present invention satisfies the need for a method for determining when a communication device should rate shift or roam in a wireless environment that improves communications performance. The method would be flexible, robust, and anticipate the rate shift and roam requirements. Communication performance would improve due to the reduced retransmission requirements, faster response time, optimum bandwidth, and fewer connection dropouts. Network connection losses would be significantly reduced and the method would dynamically adjust to the evolving wireless communication environment. In the detailed description that follows, it should be appreciated that like reference numerals are used to identify like elements illustrated in one or more of the figures.

Referring first to FIG. 1, a communication system 10 is illustrated. The communication system 10 includes a central host processor 12 connected to a wired network 14. The central host processor 12 may, for example, consist of a UNIX based system that defines the host or application environment for the wired network 14. The wired network 14 media may, for example, consist of an Ethernet, Token Ring, or ATM, and utilize network protocols such as TCP/IP, SPX/IPX, SNA LU6.2, as known in the art. The wired network 14 has a plurality of access points 16 that are coupled to the wired network 14. The plurality of access points 16 are transmitter/receivers that define basic wireless service areas called cells 18 within which a wireless communication device 20 is in range to communicate with the respective access point 16 for the given cell 18. The radio frequency (RF) wireless links are represented symbolically by RF links 26. The access point 16 acts as a bridge from the wireless communication arena defined by its cell 18 to the wired network 14. There may also be one or more wireless access points 22 that are wireless transmitter/receiver repeaters that define cells 24. The wireless access points 22 can be used to extend the wireless coverage of the access points 16 and, in general, the communication system 10, by relaying information to and from the wireless communication devices 20 and the access points 16. There may also be multiple links from one wireless access point 22 to another until finally reaching the access point 16.

Figure 2:
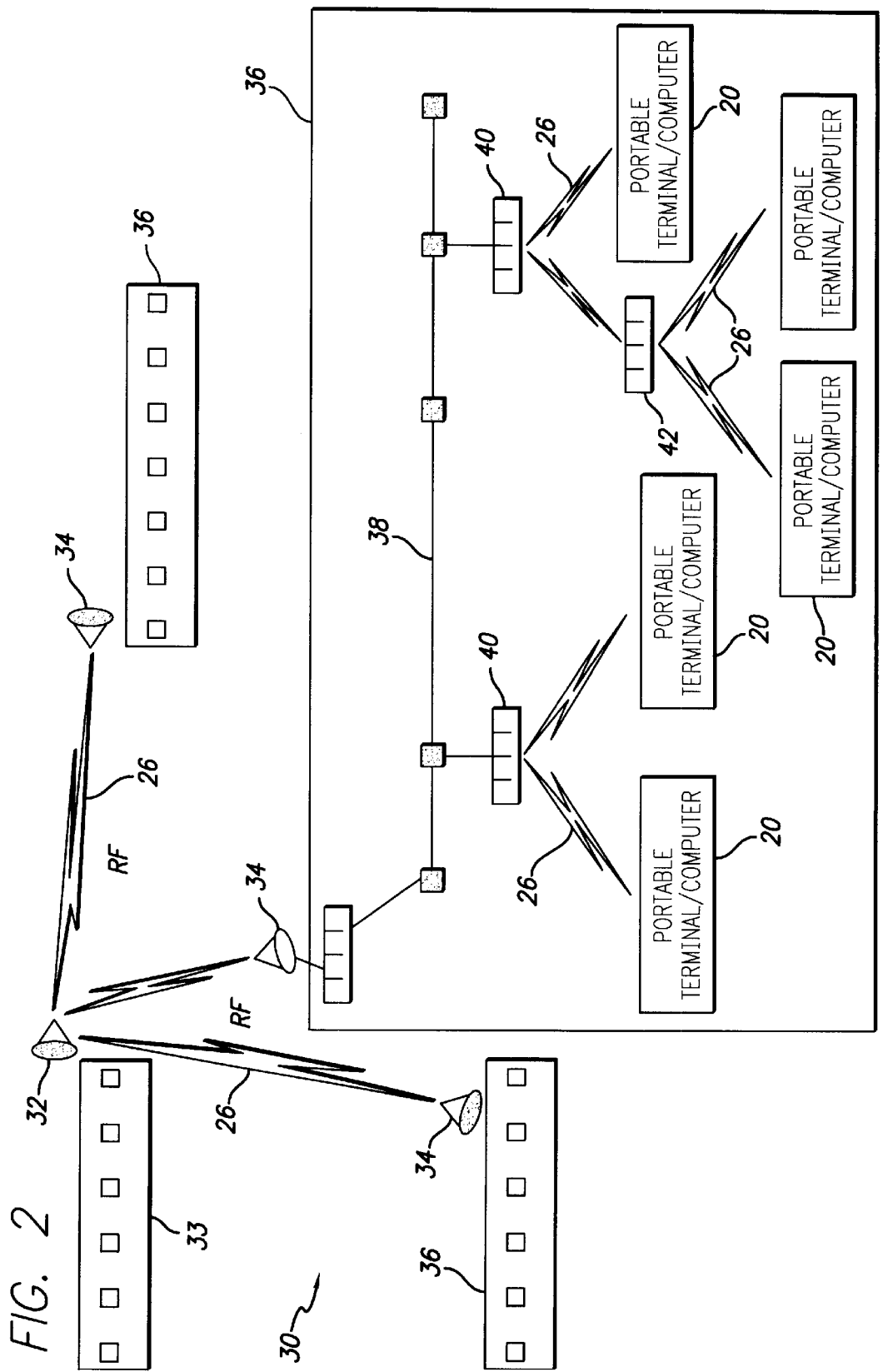
FIG. 2 is a system diagram illustrating a communication system that includes multiple facilities.

FIG. 2 illustrates a communication system 30. The communication system 30 expands upon the features of the communication system 10 of FIG. 1 by providing wireless coverage not only within a building, but also among several buildings or even within a city. The communication system 30 includes a central antenna 32 that communicates through RF links 26 to a plurality of remote antennas 34. The central antenna 32 may be attached to an administration building 33 or other central location based upon the location of the remote antennas 34. The remote antennas 34 may be located on various buildings 36 or other convenient remote locations. The building 36 may include a wired network 38 with a plurality of access points 40. The access point 40, as in FIG. 1, would consist of a transmitter/receiver defining a cell 18 that provides RF coverage for the wireless communication devices 20. The access point 40 would provide a bridge for the wireless communication devices 20 to the wired network 38. There may also be wireless access points 42 that consist of transmitter/receiver repeaters, as in FIG. 1. The wired network 38 is then linked to the administration building 33 and its associated network through the remote antenna 34 to the central antenna 32 and finally through its link to a wired network (not shown) within the administration building 33.

In FIG. 1, as the mobile worker, with the wireless communication device 20, moves throughout the work area, it is necessary to maintain the wireless connection between the wireless communication device 20 and the wired network 34 and ultimately to the central host processor 12. The wireless communication device 20 may transition between one cell 18 to another or between the cell 18 and the cell 24 covered by the wireless access point 22. In FIG. 2, the wireless communication device 20 may also transition between buildings or comprise part of a wireless wide area network.

For the examples discussed above, the wireless communications can consist of voice or data information, as known in the art. The wireless connection should be transparent to the mobile worker as the wireless communication device 20 roams from cell to cell or rate shifts. There should be no loss of connection or service degradation and it should appear as if there is a wired connection. If the RF connection begins to degrade, a determination should be made as to whether communication performance would improve by transmitting at a lower information rate or roaming to another cell offering a higher quality RF connection. This determination could be made by the wireless communication device 20 having a processor and a memory, with the processor executing a stored program for carrying out the method steps discussed below. Alternatively, the method steps may be performed centrally, for example, by the network or a central host processor.

Figure 3:
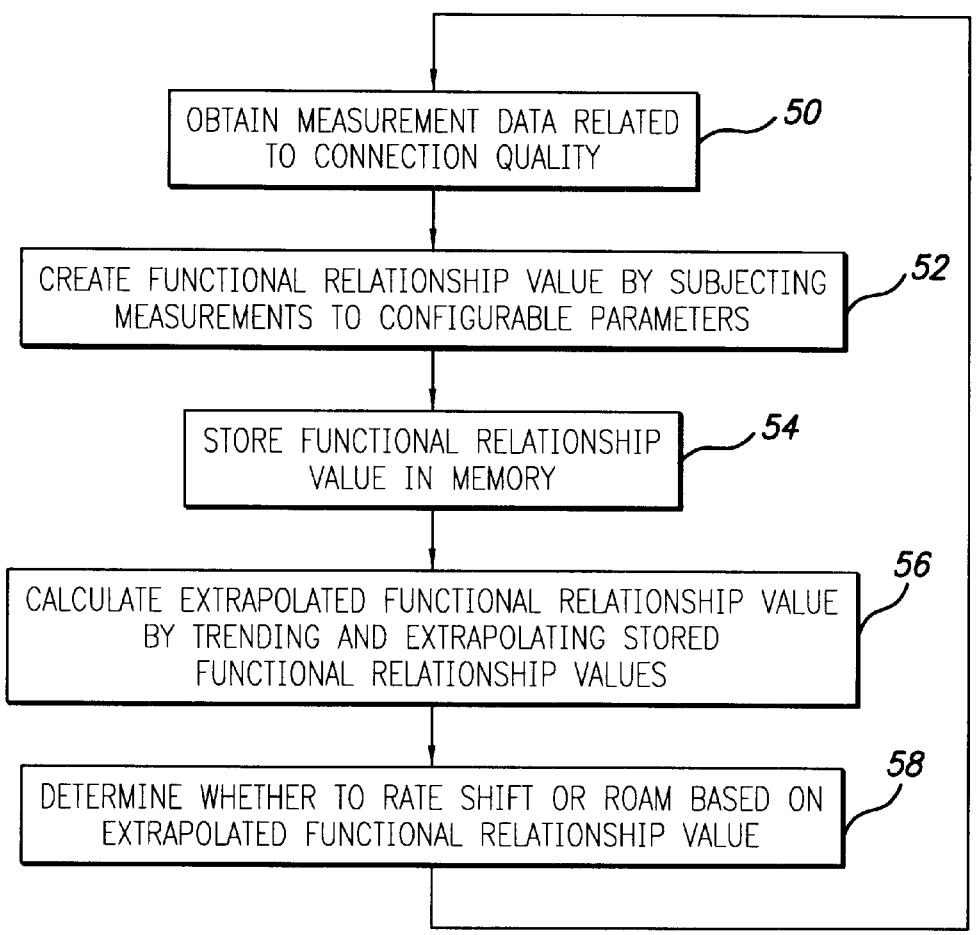
FIG. 3 is a flowchart diagram illustrating a predictive method for determining when a communication device should rate shift or roam in a wireless environment in accordance with an embodiment of the present invention.

In accordance with a first embodiment of the present invention, a predictive method for determining when a communication device should rate shift or roam in a wireless environment is provided. FIG. 3 illustrates the basic steps, in flowchart form, of the predictive method. The method would utilize various measurements to evaluate connection quality, the measurement data obtained at step 50. These measurements may include but are not limited to: 1) signal-to-noise ratio (SNR), 2) bit error rate (BER), 3) number of transmission retries (NTR), 4) received signal strength indicator (RSSI), 5) bit energy-to-noise density ($E_b/N_o$), 6) global position information (GPS), and 7) cell congestion information (also known as load factor). These measurements ($m_j$) would be utilized in conjunction with configurable parameters that controls the use of $m_j$ such as: 1) utilization of a measurement (e.g., yes/no) $u_j$, 2) how measurement is used (e.g., weighting factor) $h_j$, and 3) related measurement decision criteria (e.g., threshold) $d_j$. At step 52, the measurements, subjected to the configurable parameters, create a functional relationship $f_j(m_j, u_j, h_j, d_j)$. The functional relationship value is stored in memory at step 54. At step 56, the value of function $f_j$ in conjunction with measurements taken at prior time intervals $t_1, t_2, \ldots, t_n$ with respective values of function $f_{j-1}, f_{j-2}, \ldots, f_{j-n}$ are trended and extrapolated to yield extrapolated value $f_{j+1}$. The extrapolated value, $f_{j+1}$, is then used to determine, at step 58, whether to rate shift or roam prior to the next transmission.

Thus, this method evaluates the most recent measurements sampled and extrapolates future measurements based on the data trend. This allows anticipation of the need to rate shift or roam rather than to wait for an unsuccessful transmission or comparison against a fixed predefined threshold. The prediction of future measurements can even be performed while the last transmission is taking place. Thus, a proactive approach for rate shifting and roaming is adopted that can be critical when the mobile worker is moving swiftly on a motorized vehicle or when using high speed data and voice transmission rates.

In accordance with a second embodiment of the present invention, a heuristic method for determining when a communication device should rate shift or roam in a wireless environment is provided. This method initially only rate shifts or roams based on a failure to transmit or receive. The values of measurement parameters that are being used to characterize the quality of a connection on every transmission or reception are recorded. When a failure occurs, the previous measurements taken are stored in a data vector. There is one data vector for each rate shift and one for roaming. The values in each data vector are then utilized to establish the criteria to rate shift or roam.

Figure 4:
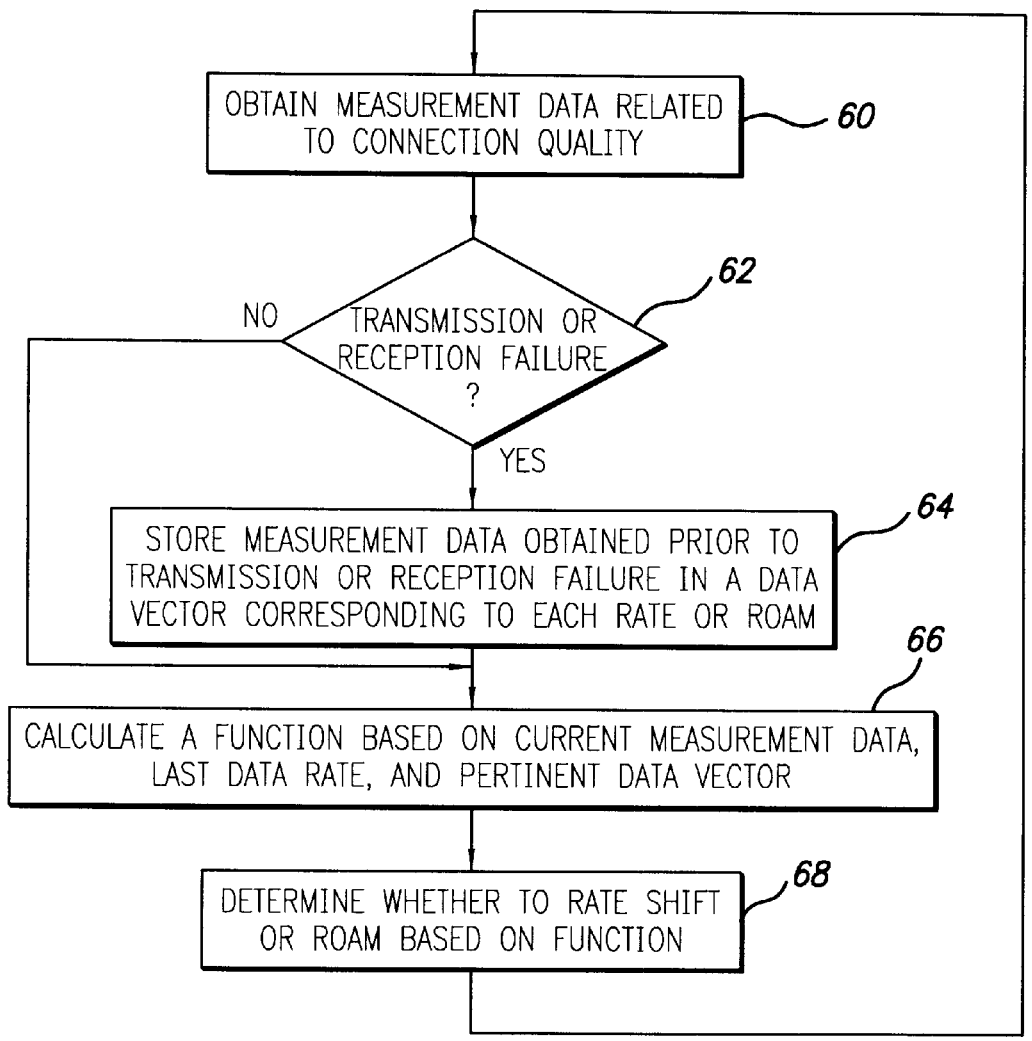
FIG. 4 is a flowchart diagram illustrating a heuristic method for determining when a communication device should rate shift or roam in a wireless environment in accordance with an embodiment of the present invention.

FIG. 4 illustrates the basic steps, in flowchart form, of the heuristic method. This method would utilize various measurements, taken at step 60, to evaluate connection quality. These measurements may include but are not limited to: 1) signal-to-noise ratio (SNR), 2) bit error rate (BER), 3) number of transmission retries (NTR), 4) received signal strength indicator (RSSI), 5) bit energy-to-noise density ($E_b/N_o$), 6) global position information (GPS), and 7) cell congestion information. These measurements ($m_j$) would be utilized in conjunction with historical data vectors ($r_j$) that represent when a rate shift or roam should occur. The historical data vectors store the measurements taken prior to a transmission or reception failure for each rate shift and one for roam, as shown at step 62 and 64. The current measurements $m_j$, last data rate $L_j$, and pertinent vector $r_j$ are then used to determine whether to rate shift or roam based on a function $f(m_j, L_j, r_j)$, as shown at step 66 and 68. The function f can be a very simplistic function that performs a compare operation against the vector values $r_j$ or it can be a more sophisticated function such as taking the median, highest, or lowest value of $r_j$.

Thus, it dynamically calculates the rate shift and roam criteria based on a given wireless environment. If the wireless environment changes, the decision criteria will evolve and be automatically updated to reflect the current wireless environment. With each transmission or reception, the measurements are compared to the rate shift and roaming criteria and the appropriate action is taken. The vector updates and criteria updates occur after the last transmission or reception and prior to the next. In this fashion, the criteria is always optimal. The result is a rate shift and roaming algorithm that is tailored to a customer's environment and that dynamically adjusts to changes in the wireless environment.

Having thus described preferred embodiments of methods for determining when a communication device should rate shift or roam in a wireless environment, it should be apparent to those skilled in the art that certain advantages of the within system have been achieved. It should also be appreciated that various modifications, adaptations, and alternative embodiments thereof may be made within the scope and spirit of the present invention. For example, a wireless environment along with a wired LAN has been illustrated to show an embodiment of the present invention, but it should be apparent that the inventive concepts described above would be equally applicable to a wireless network or wireless communication system, as known in the art. Furthermore, the wireless communication system could comprise any type of wireless RF communication system and include voice and data communications, as known in the art. The invention is further defined by the following claims.

What is claimed is:

1. A method of improving communication performance in a wireless communication system, said wireless communication system having at least one mobile wireless communication device and a plurality of transmitter/receiver sites, each of which has a geographic area, defined as a cell, within which said at least one mobile wireless communication device can communicate with at least one of said transmitter/receiver sites, said method of improving communication performance comprising the steps of:
    obtaining at least one measurement related to connection quality at discrete intervals;
    subjecting said at least one measurement to at least one configurable parameter to create a functional relationship value that is recorded; and
    trending and extrapolating the recorded said functional relationship values to obtain an extrapolated functional relationship value which is used to determine whether to rate shift or roam.

2. The method of claim 1, wherein said at least one measurement comprises at least one of signal-to-noise ratio, bit error rate, number of transmission retries, received signal strength indicator, bit energy-to-noise density, global position information, and cell congestion information.

3. The method of claim 1, wherein said at least one configurable parameter comprises at least one of measurement utilization criteria, measurement application criteria, and measurement decision criteria.

4. The method of claim 3, wherein said measurement utilization criteria comprises a use/don't use decision.

5. The method of claim 3, wherein said measurement application criteria comprises a weighting factor.

6. The method of claim 3, wherein said measurement decision criteria comprises a threshold.

7. A method of improving communication performance in a wireless communication system, said wireless communication system having at least one mobile wireless communication device and a plurality of transmitter/receiver sites, each of which has a geographic area, defined as a cell, within which said at least one mobile wireless communication device can communicate with at least one of said transmitter/receiver sites, said method of improving communication performance comprising the steps of:
    obtaining at least one measurement related to connection quality at discrete intervals;
    storing said at least one measurement taken prior to a communication connection failure in at least one data vector, there being said at least one data vector for each rate shift and one for roam; and
    determining whether to rate shift or roam based on a functional relationship utilizing current measurements, last data rate, and respective said at least one data vector.

8. The method of claim 7, wherein said at least one measurement comprises at least one of signal-to-noise ratio, bit error rate, number of transmission retries, received signal strength indicator, bit energy-to-noise density, global position information, and cell congestion information.

9. The method of claim 7, wherein said determining step further comprises a step of comparing between said current measurements and said last data rate with respective said at least one data vector to derive said functional relationship.

10. The method of claim 7, wherein said determining step further comprises a step of comparing between said current measurements and said last data rate with the median value of respective said at least one data vector to derive said functional relationship.

11. The method of claim 7, wherein said determining step further comprises a step of comparing between said current measurements and said last data rate with the highest value of respective said at least one data vector to derive said functional relationship.

12. The method of claim 7, wherein said determining step further comprises a step of comparing between said current measurements and said last data rate with the lowest value of respective said at least one data vector to derive said functional relationship.

13. A wireless communication system having at least one mobile wireless communication device and a plurality of transmitter/receiver sites, each of which has a geographic area, defined as a cell, within which said at least one mobile wireless communication device can communicate with at least one of said transmitter/receiver sites, said mobile wireless communication device having a memory and a processor that runs a program stored in said memory, said program comprising the steps of:
    a first step of obtaining at least one measurement related to connection quality at discrete intervals;
    a second step of subjecting said at least one measurement to at least one configurable parameter to create a functional relationship value that is recorded; and
    a third step of trending and extrapolating the recorded said functional relationship values to obtain an extrapolated functional relationship value which is used to determine whether to rate shift or roam.

14. The wireless communication system of claim 13, wherein said at least one measurement comprises at least one of signal-to-noise ratio, bit error rate, number of transmission retries, received signal strength indicator, bit energy-to-noise density, global position information, and cell congestion information.

15. The wireless communication system of claim 13, wherein said at least one configurable parameter comprises at least one of measurement utilization criteria, measurement application criteria, and measurement decision criteria.

16. The wireless communication system of claim 15, wherein said measurement utilization criteria comprises a use/don't use decision.

17. The wireless communication system of claim 15, wherein said measurement application criteria comprises a weighting factor.

18. The wireless communication system of claim 15, wherein said measurement decision criteria comprises a threshold.

19. The wireless communication system of claim 13, wherein said wireless communication system further comprises a local area network.

20. The wireless communication system of claim 19, wherein said local area network further comprises a wired network system and a central host processor, with said plurality of transmitter/receiver sites coupled to said wired network system.

21. A wireless communication system having at least one mobile wireless communication device and a plurality of transmitter/receiver sites, each of which has a geographic area, defined as a cell, within which said at least one mobile wireless communication device can communicate with at least one of said transmitter/receiver sites, said mobile wireless communication device having a memory and a processor that runs a program stored in said memory, said program comprising the steps of:

a first step of obtaining at least one measurement related to connection quality at discrete intervals;

a second step of storing said at least one measurement taken prior to a communication connection failure in at least one data vector, there being said at least one data vector for each rate shift and one for roam; and a third step of determining whether to rate shift or roam based on a functional relationship utilizing current measurements, last data rate, and respective said at least one data vector.

22. The wireless communication system of claim 21, wherein said at least one measurement comprises at least one of signal-to-noise ratio, bit error rate, number of transmission retries, received signal strength indicator, bit energy-to-noise density, global position information, and cell congestion information.

23. The wireless communication system of claim 21, wherein said third step further comprises a step of comparing between said current measurements and said last data rate with respective said at least one data vector to derive said functional relationship.

24. The wireless communication system claim 21, wherein said third step further comprises a step of comparing between said current measurements and said last data rate with the median value of respective said at least one data vector to derive said functional relationship.

25. The wireless communication system of claim 21, wherein said third step further comprises a step of comparing between said current measurements and said last data rate with the highest value of respective said at least one data vector to derive said functional relationship.

26. The wireless communication system of claim 21, wherein said third step further comprises a step of comparing between said current measurements and said last data rate with the lowest value of respective said at least one data vector to derive said functional relationship.

27. The wireless communication system of claim 21, wherein said wireless communication system further comprises a local area network.

28. The wireless communication system of claim 27, wherein said local area network further comprises a wired network system and a central host processor, with said plurality of transmitter/receiver sites coupled to said wired network system.

29. A storage medium containing program instructions executable by a processor for improving communication performance in a wireless communication system, said program comprising:

a first step of obtaining at least one measurement related to connection quality at discrete intervals;

a second step of subjecting said at least one measurement to at least one configurable parameter to create a functional relationship value that is recorded; and a third step of trending and extrapolating the recorded said functional relationship values to obtain an extrapolated functional relationship value which is used to determine whether to rate shift or roam.

30. The storage medium of claim 29, wherein said at least one measurement comprises at least one of signal-to-noise ratio, bit error rate, number of transmission retries, received signal strength indicator, bit energy-to-noise density, global position information, and cell congestion information.

31. The storage medium of claim 29, wherein said at least one configurable parameter comprises at least one of measurement utilization criteria, measurement application criteria, and measurement decision criteria.

32. The storage medium of claim 31, wherein said measurement utilization criteria comprises a use/don't use decision.

33. The storage medium of claim 31, wherein said measurement application criteria comprises a weighting factor.

34. The storage medium of claim 31, wherein said measurement decision criteria comprises a threshold.

35. A storage medium containing program instructions executable by a processor for improving communication performance in a wireless communication system, said program comprising:

a first step of obtaining at least one measurement related to connection quality at discrete intervals;

a second step of storing said at least one measurement taken prior to a communication connection failure in at least one data vector, there being said at least one data vector for each rate shift and one for roam; and a third step of determining whether to rate shift or roam based on a functional relationship utilizing current measurements, last data rate, and respective said at least one data vector.

36. The storage medium of claim 35, wherein said at least one measurement comprises at least one of signal-to-noise ratio, bit error rate, number of transmission retries, received signal strength indicator, bit energy-to-noise density, global position information, and cell congestion information.

37. The storage medium of claim 35, wherein said third step further comprises a step of comparing between said current measurements and said last data rate with respective said at least one data vector to derive said functional relationship.

38. The storage medium of claim 35, wherein said third step further comprises a step of comparing between said current measurements and said last data rate with the median value of respective said at least one data vector to derive said functional relationship.

39. The storage medium of claim 35, wherein said third step further comprises a step of comparing between said current measurements and said last data rate with the highest value of respective said at least one data vector to derive said functional relationship.

40. The storage medium of claim 35, wherein said third step further comprises a step of comparing between said current measurements and said last data rate with the lowest value of respective said at least one data vector to derive said functional relationship.

* * * * *